UNITED STATES PATENT OFFICE.

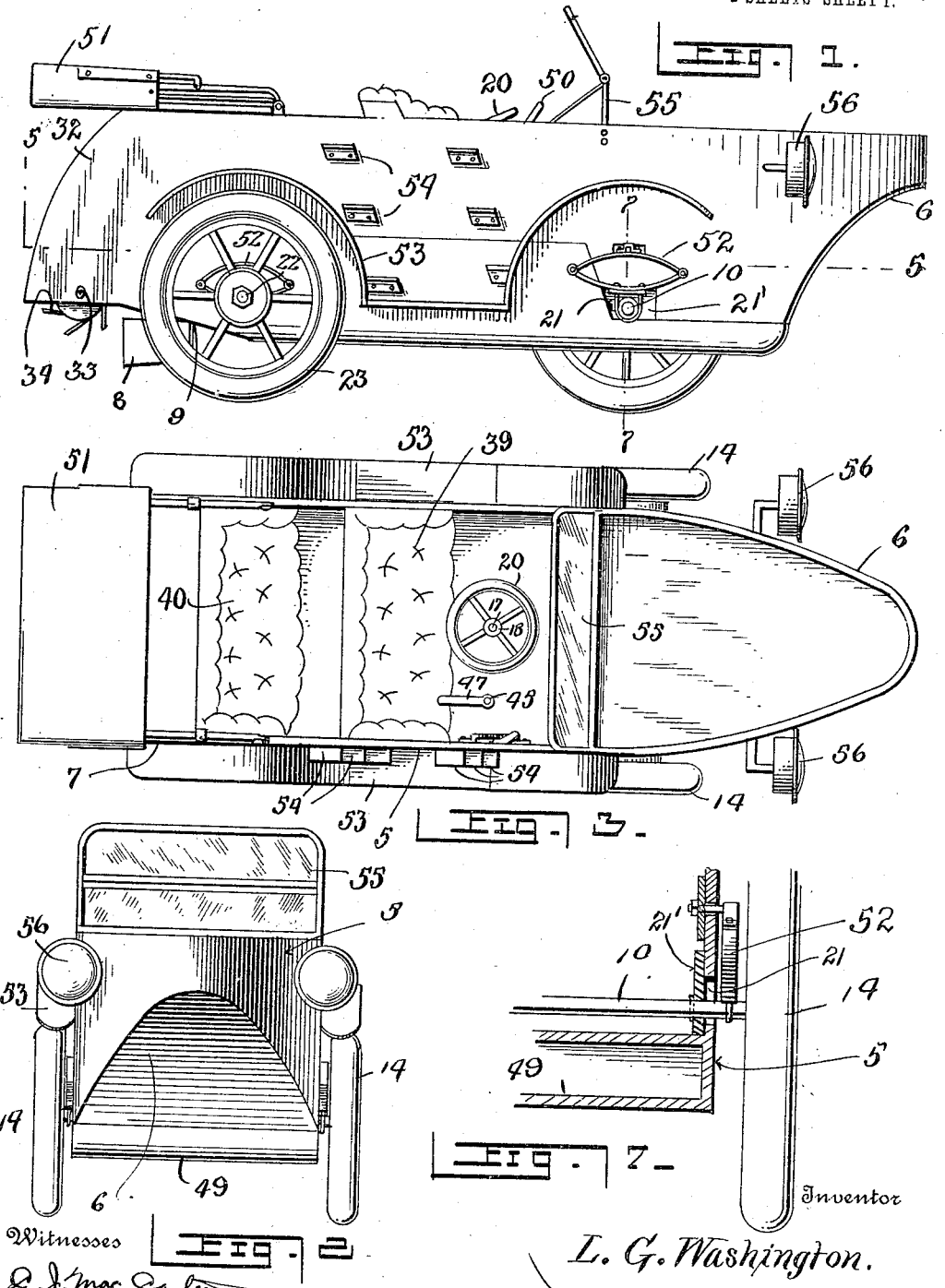

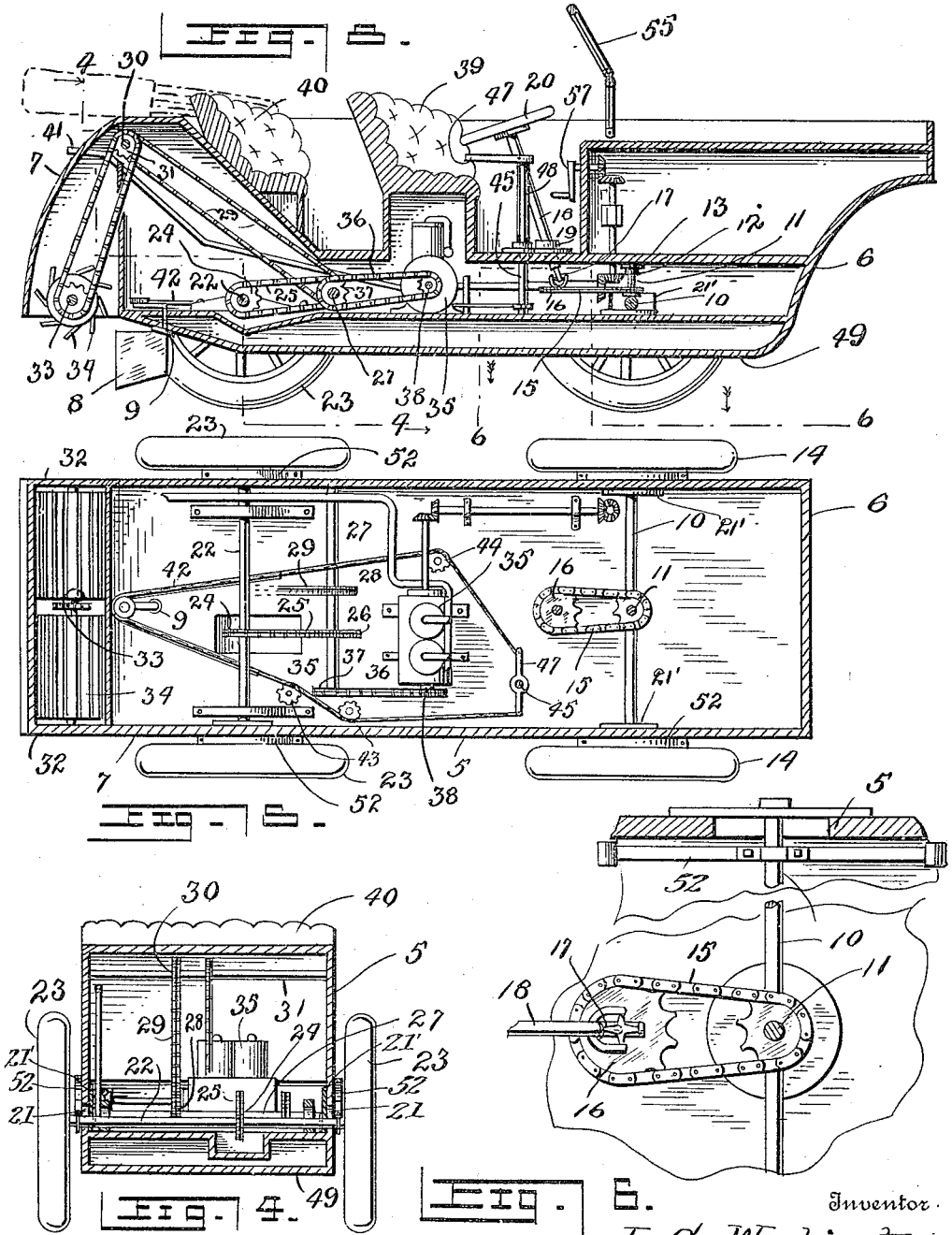

LONNIE G. WASHINGTON, OF DUNNELLON, FLORIDA.

COMBINED AUTOMOBILE AND BOAT.

1,122,671.  Specification of Letters Patent.  Patented Dec. 29, 1914.

Application filed August 16, 1912. Serial No. 715,520.

*To all whom it may concern:*

Be it known that I, LONNIE G. WASHINGTON, a citizen of the United States, residing at Dunnellon, in the county of Marion, State of Florida, have invented certain new and useful Improvements in Combined Automobiles and Boats; and I do hereby declare the following to be a full, clear, and exact description of the invention, such as will enable others skilled in the art to which it appertains to make and use the same.

This invention relates to improvements in automobile boats or a boat associated with an automobile and more particularly to an improvement upon my allowed application, Serial Number 591,723, filed November 10, 1910.

The primary object of the invention is to provide an automobile boat of neat appearance and simple construction which can be alternately driven over the ground or in the water by the same engine and driving mechanism and also in which the working parts are more completely inclosed within the hull and less liable to injury.

With the above and other objects in view, the invention consists in certain constructions, combinations and arrangements of parts clearly described in the following specification and clearly illustrated in the accompanying drawings, in which:

Figure 1 is a side elevation of the invention with one of the front wheels removed. Fig. 2 is a front elevation. Fig. 3 is a top plan view. Fig. 4 is a transverse sectional view taken on the line 4—4 of Fig. 8, and looking in the direction of the arrows. Fig. 5 is a horizontal sectional view taken on the line 5—5 of Fig. 1. Fig. 6 is a detail sectional view taken on the line 6—6 of Fig. 8 looking downwardly and more particularly disclosing the steering mechanism. Fig. 7 is a detail sectional view showing the axle supports and part of the hull in section. Fig. 8 is a longitudinal sectional view of the machine.

In the accompanying drawings, 5 denotes a hull or body having a bow end 6 and a stern end 7. The bow end 6 is curved inwardly to readily pass through the water and offer little resistance to it or air pressure and a rudder 8 is hinged at 9 to the hull 5 at the stern end. Transversely mounted through the front portion of the hull is a front axle 10 which is formed with a medially located vertical extension 11 which extends through a sleeve 12 secured at its upper end to the floor 13 of the body or hull 5. On the ends of the front axle 10 the wheels 14 are mounted for rotation on said axle and the axle 10 is connected by a chain 15 with a sprocket wheel 16 mounted on the lower end of an operating rod 17 in any well-known manner. The rod 17 operates through a sleeve 18 which is secured at its lower end to the tubular support 19 and the upper end of the guide rod 17 carries a steering wheel 20 which is keyed thereto. By turning the wheel 20 the front axle 10 may be steered in any direction on its pivot to permit quick and convenient control of the movements of the machine. The outer ends of the front axle 10 extend through openings 21 formed in the hull or body 5 beneath the flooring and suitable means are provided, as plates 21' for preventing water from flowing through the openings which are made sufficiently large to permit proper movement of the front axle in steering the vehicle. On the rear end of the body or hull 5 a rear axle 22 is journaled and on the outer ends of said rear axle wheels 23 are mounted. The rear axle 22 is provided with a centrally disposed sprocket wheel 24 arranged within the body and having a sprocket chain 25 trained therearound and also trained over a sprocket wheel 26 of a counter-shaft 27 which is journaled medially of the ends of the body or hull and within the same. The counter-shaft 27 is provided with a second sprocket wheel 28 over which a sprocket chain 29 is trained and extended rearwardly for engaging a sprocket wheel 30 carried by a shaft 31 rotatably journaled in the top portion of the rear end of the body.

The body or hull is provided with a rear plate having side extensions 32 rotatably supporting the extremities of a propeller shaft 33 on which the propeller 34 is mounted. This propeller comprises a drum having radial blades for engaging the water and this propeller may be driven simultaneously with or independently of the rear drive wheels according to which of the chains 25 and 29 are operatively connected with the counter-shaft 27. The counter-shaft and parts are driven from a motor 35 preferably of the internal combustion type, by means of a sprocket chain 36 engaged around a sprocket wheel 37 mounted on the counter-shaft and a sprocket wheel 38 carried by the engine shaft. The engine or motor 35 is arranged in the front portion of the body, which latter is provided with a front seat 39 and a rear seat 40 while the exhaust port 41 of the engine extends from the rear ends of the body near the top thereof so as to discharge the exhaust gases above the water line when the machine is in the water.

The rudder 8 is connected by the chain 42 with the sprocket wheels 43 and the sprocket wheel 44 and to the steering rod 45 which has a lever 47 pivoted to its upper end and which extends through a tubular guide 48. By turning the lever 47 the rudder can be manipulated in any desired direction. An auxiliary hull plate or bottom 49 is secured to the bottom of the hull 5 and a lever 50 is provided for controlling a suitable brake, not shown, operating on the rear axle. The body is provided with a top 51, is supported on springs 52 engaging the body and axles, is provided with mud guards 53 and steps 54 for entering and leaving the car and also with a wind shield 55 and head lights 56. The engine may be cranked from the driver's seat through the medium of a crank 57 without the necessity of getting out of the machine.

I claim:

1. A combined automobile and boat comprising a boat shaped body, a pair of axles carried by the body, an auxiliary hull plate secured to the bottom of the body and spaced therefrom, one of said axles being movable through slots in the sides of the body, a propeller for the body, means for actuating the propeller and one of the axles, wheels on said axle and a steering mechanism for the body.

2. A combined automobile and boat embodying a hull having a truncated portion at one end, a casing at one end of the hull having a closed top and side extensions, a propeller wheel rotatably mounted in said extensions, wheeled axles mounted in the body of the hull, a motor, drive connections between the motor and one axle, and the motor and propeller, said last mentioned connections operating through the hull casing above the propeller wheel, a rudder mounted on one end of the hull, the other axle serving as a steering axle and means for independently actuating the rudder and means for actuating the steering axle.

3. In a combined automobile and boat, a hull, propelling means therefor, steering means therefor, wheeled axles for the hull, said hull having opposed slots therethrough, one of the axles serving as a drive axle and the other serving as a steering axle, said steering axle being movable through the slots, spring means between the hull and axles and plates carried by the steering axle to contact with the hull over the area of the slots.

In testimony whereof, I affix my signature, in presence of two witnesses.

LONNIE G. WASHINGTON.

Witnesses:
M. L. BARKSDALE,
J. M. BARKSDALE.

Copies of this patent may be obtained for five cents each, by addressing the "Commissioner of Patents, Washington, D. C."